Dec. 19, 1933. E. H. BLATTNER ET AL 1,940,042
JOURNAL BOX
Filed Sept. 3, 1931 2 Sheets-Sheet 1

INVENTOR
E. H. Blattner
E. R. Oeschger
BY
Ernest P. Mechlin
ATTORNEY

Dec. 19, 1933.   E. H. BLATTNER ET AL   1,940,042
JOURNAL BOX
Filed Sept. 3, 1931   2 Sheets-Sheet 2
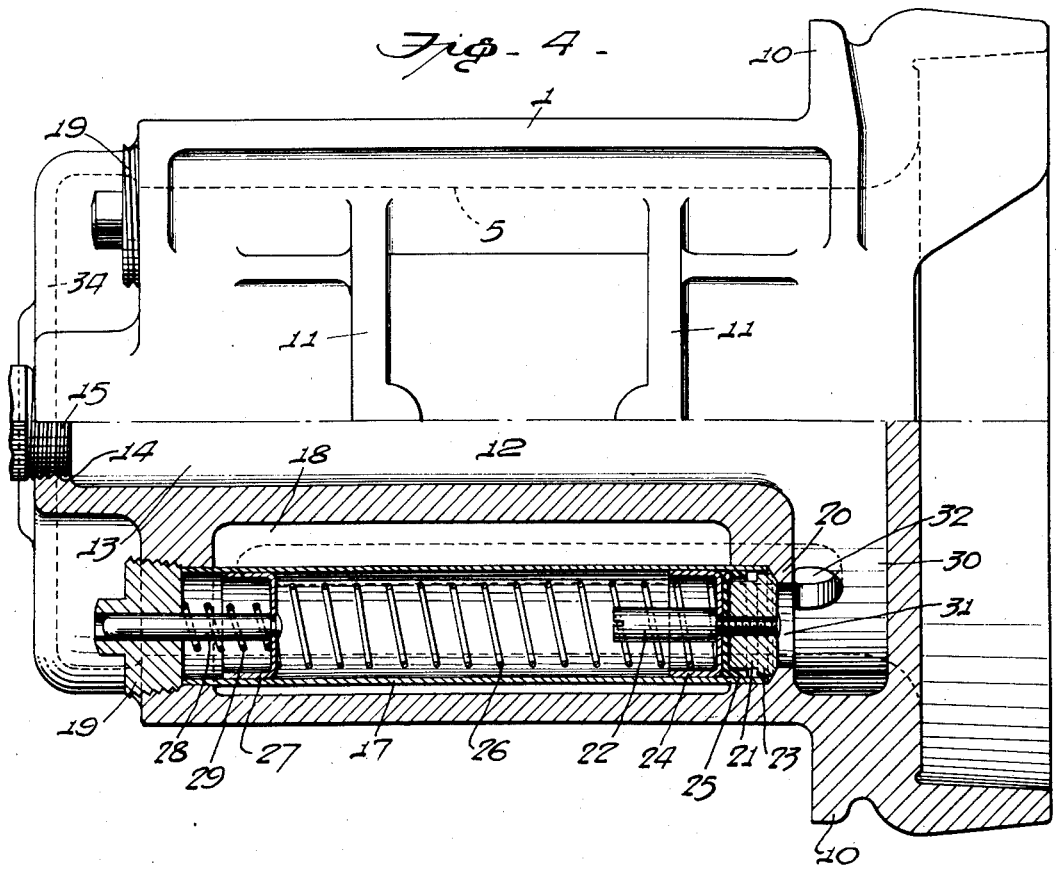
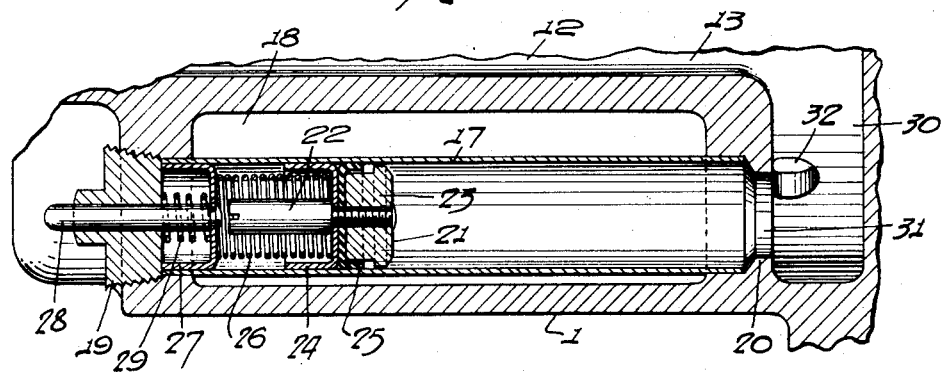
INVENTOR
E. H. Blattner
E. R. Oeschger
BY
Ernest Mechlin
ATTORNEY Patented Dec. 19, 1933

1,940,042

UNITED STATES PATENT OFFICE 1,940,042

JOURNAL BOX

Emil H. Blattner and Eugene R. Oeschger, Rochester, N. Y., assignors to The Symington Company, New York, N. Y., a corporation of Maryland Application September 3, 1931. Serial No. 561,032

6 Claims. (Cl. 308—81)

This invention relates to journal boxes and, more particularly, to such utilizing means for automatically supplying lubricant to the bearing surfaces.

The principal object of the invention, generally considered, is to provide a journal box adapted to receive a journal, with or without an associated floating bushing, said box being formed with passages or reservoirs normally holding lubricant and means for maintaining said lubricant under pressure so that it feeds to the bearing surfaces, as needed.

Another object of the invention is to provide a journal box having a journal receiving opening and an interior passage extending longitudinally above said opening, said passage being open at its outer end for the introduction of lubricant, a transversely extending passage being provided communicating with said longitudinal passage and with the inner end of means forming a cylinder and a spring-actuated piston operating in said cylinder for acting on lubricant contained therein and forcing it through a suitable port or ports to the bearing surfaces, as required.

A further object of the invention is to provide a journal box formed with a bearing surface adapted to cooperate with an associated journal and an interior passage for receiving lubricant, said bearing surface having a port normally communicating with said passage, said box also being provided with a cylinder communicating with said passage, a piston operating in said cylinder, a spring normally acting to move said piston to maintain enclosed lubricant under pressure and cause it to feed through said port, a follower upon which said spring bears and a rod movable by said follower and extending through an opening in said cylinder, and a spring for normally forcing said follower toward the opposite end of said cylinder, said rod, by extending out of said cylinder, serving as a tell-tale device or indicator showing whether or not the lubricant in the passage or reservoir needs replenishing.

Other objects and advantages of the invention relating to the particular arrangement and construction of the various parts will become apparent as the description proceeds.

Referring to the drawings illustrating the invention, the scope whereof is defined by the appended claims:—

Figure 4 is a partial plan and partial horizontal sectional view on the line 4—4 of Figure 3, looking in the direction of the arrows, said view being on an enlarged scale as compared with Figure 3.

Figure 5 is a fragmentary view corresponding to Figure 4, but showing the lubricant-actuated piston and associated spring in partly compressed position.

Figure 1:
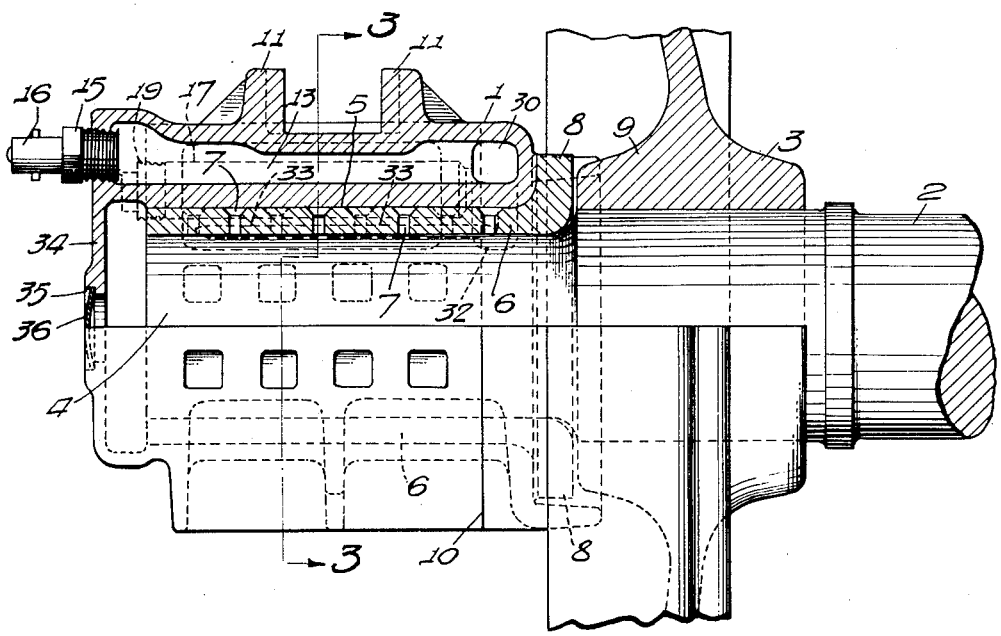
Figure 1 is a partial side elevational view and partial vertical section through the axis of a journal box embodying the invention, fragmentary portions of an associated journal and wheel being illustrated.
Figure 2:
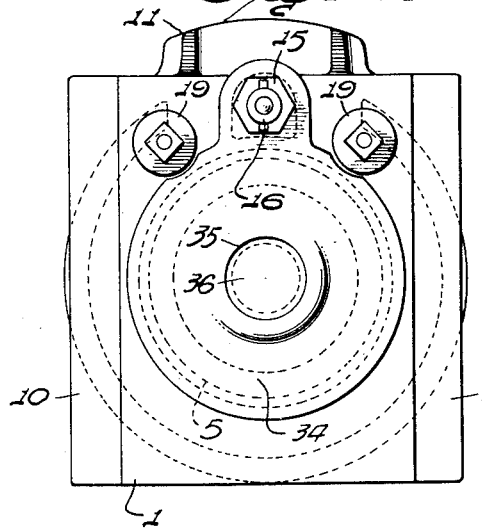
Figure 2 is an end elevation of the box shown in Figure 1.
Figure 3:
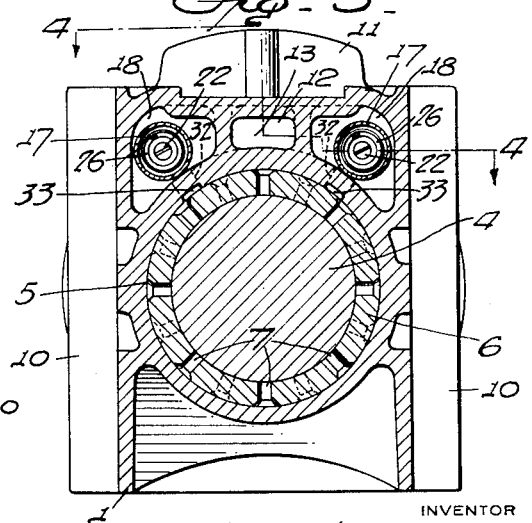
Figure 3 is a transverse sectional view on the line 3—3 of Figure 1, looking in the direction of the arrows.

Referring to the drawings in detail, like parts being designated by like reference characters, there is shown a journal box 1 associated with an axle 2 having a wheel 3 thereon and formed with a journal 4. Surrounding the journal and received in the aperture defined by the bearing surface 5 of the box 1 is a floating bushing 6, apertured, as indicated at 7, for the transfer of lubricant from one bearing face to the other, and having an inner outstanding flange 8 disposed between the box 1 and the hub 9 of the wheel 3 to function as a hub liner. The box 1, in the present embodiment, has outstanding flange portions 10 providing channels on either side thereof adapted to engage the legs or depending portions of a truck pedestal (not shown), thereby forming pedestal ways. The top of the box 1 is desirably provided with upstanding flanges 11 adapted to receive an associated equalizer (not shown).

In order to provide for lubricating the journal 4 and bushing 6, if such a bushing is used therewith, the body portion of the box above the journal receiving opening defined by the bearing surface 5 is provided, as by coring, with a lubricant reservoir 12, said reservoir desirably comprising a longitudinal passage 13 provided with an opening 14 at its front end normally closed by a pipe plug 15 preferably provided with a valved fitting, of a type such as used for "Alemite" lubricant, or the like, 16 adapted to receive grease, or other lubricant.

Preferably disposed on either side of the passage 13 are means forming cylinders 17, said means, in the present embodiment, being separate tubes fitted in cored passages 18, which are preferably longitudinal or substantially parallel to the passage 13, and held in place by plugs 19 engaging the outer ends of said tubes or pipes 17 and holding the inner ends against shoulders 20. In order to provide a fluid-tight fit of the tubes 17 in the journal box 1, those portions of the webs of the box defining the ends of the passages 18 are preferably machined to snugly hold the end portions of the tubes. Each cylinder or tube 17 desirably receives a piston or plunger member 21 desirably formed with a stem 22 and nut 23 threaded thereon, between which elements are disposed a guide 24 preferably formed of pressed metal and a preferably cup leather plunger or washer 25, so that leakage along the cylinder past the piston is obviated.

In order to maintain the lubricant in the reservoir 12 under pressure, a spring 26 is desirably employed acting between the guide 24 of the piston 21 and a follower 27 of desirably corresponding construction, said follower preferably having a stem 28 adapted to extend through the plug 19 beyond the outer surface of the cylinder to act as a telltale, as shown in Figure 5, when the reservoir 12 is filled with lubricant. The follower 27 and its stem or tell-tale device 28, when the supply of lubricant is depleted, is withdrawn from engagement with the plug 19, as shown most clearly in Figure 4, by means of a spring 29 acting between said plug and the follower 27.

Each cylinder 17 is desirably connected to the longitudinal passage 13 by means of a transverse passage 30, the outer ends of which are in communication with ports 31 connecting the passage 30 with the cored portions 18. In order to provide for the distribution of lubricant under pressure to the cylindrical bearing surface 5 of the box, ports 32 are desirably provided connecting said reservoir 12 with the surface 5, longitudinally extending grooves 33 being desirably provided for distributing the lubricant for substantially the full length of the bearing surface between the box and the journal 4, or floating bushing 6, if used.

In the present embodiment, the cored cavities 18 are not employed for the reception of lubricant. The cavities may, if desired, be connected with the reservoir 12 and ports therefrom may be formed for the distribution of lubricant to the bearing surface 5. In order to provide for the production of accurate castings and the simplification of the major machining operation, the outer wall 34 of the box is desirably apertured, as indicated at 35, said aperture being normally closed after machining by an efficient form of spring disk 36.

From the foregoing, it will be seen that the journal box described may be operated as follows:—Lubricant is introduced to the reservoir 12 through the fitting 16 and passes through the longitudinal passage 13 to the transverse passage 30, and through the ports 31 to push the pistons 21 outwardly in the cylinders 17, compressing the springs 26 and, in turn, forcing the followers 27 outwardly against the pressure of the springs 29, so that the tell-tale devices or stems 28 stick out from the outer face of the box and indicate that sufficient lubricant has been applied to the box, the pistons 21 and followers 27 being then disposed in the outer portions of the cylinders 17, as shown in Figure 5.

As lubricant is used during the operation for movement of the wheel 3 and journal 4, the piston 21 will follow the flow of lubricant therefrom, maintaining said lubricant under a desired amount of pressure, so that the bearing is maintained well lubricated at all times. When the supply of lubricant, which is preferably grease requiring heat to bring it to a fluid condition, is used to the extent that the piston reaches the inner limit of its travel, as shown in Figure 4, it will be clear that said lubricant is by no means exhausted, but is not under spring pressure. For this reason, the lubricant would then not be as freely supplied to the bearing, and only to any great extent when the box becomes heated sufficiently to cause it to assume a liquid or fluid state. The tell-tale device or stem 28 will, however, show that the supply of lubricant needs replenishing, and said supply will, of course, then be introduced through the fitting 16 previously referred to.

The spring 29 is preferably formed so that when closed it exerts a pressure less than that of the spring 26 when closed, but greater than that of the spring 26 when opened or expanded. This is in order that the larger spring 26 will complete the greater part of its work, say from 60% to 80%, before the tell-tale will begin to move in, thereby preventing the operation of refilling before it is necessary. In a preferred embodiment, the spring 29 will have such a strength that the tell-tale will begin to move in when the spring 26 is still under approximately twelve pounds of pressure. The spring 26 may, under such circumstances, have a closing pressure of thirty pounds, and when expanded, as shown in Figure 4, may still be under a pressure of eight pounds.

It will also be clear that springs such as shown may be employed in which the tell-tale will have moved completely out of sight, while the main plunger 21 still has some inward movement to make. For such circumstances, the tell-tale spring 29 may have a closing pressure of twelve pounds, as previously mentioned, and when the pressure is relieved to ten pounds, the tell-tale 28 may have been entirely withdrawn, while the main spring does not complete its work until it has expanded from a closed pressure of thirty pounds to a pressure of eight pounds when released to the position shown in Figure 4. If this kind of an operation is desired, of course, it will be necessary to have some sort of a stop either inside of the cylinder 17, or on the tell-tale rod, to prevent inward movement beyond a predetermined point, that is, to prevent a release of the pressure on the spring 29 of more than two pounds or beyond an expansive range of from twelve to ten pounds.

From the foregoing disclosure, it will be seen that we have devised an improved form of box dispensing with the usual oil-saturated waste, and utilizing instead grease or similar lubricant which is fed to the bearing, as needed, by spring pressure, means being provided for indicating when the lubricant in the box needs replenishing.

Although a preferred embodiment of the invention has been illustrated, it will be understood that modifications may be made within the spirit and scope of the appended claims.

We claim:—

1. A journal box having a passage extending longitudinally thereof and open at its outer end for the introduction of lubricant, an interior passage extending transversely of said box and communicating with said longitudinal passage adjacent the inner end of the latter, means forming a cylinder joined by a port to said transverse passage, a piston operating in said cylinder, and a spring for normally forcing said piston rearwardly towards said transverse passage, said box being provided with a curved downwardly facing bearing surface and having a port, opening through said surface, affording communication with one of said passages.

2. A journal box having an interior passage extending longitudinally thereof and open at one end for the introduction of lubricant, means forming a cylinder extending longitudinally of said body and spaced at its ends from said longitudinal passage, a piston operating in said cylinder, and a spring cooperating with said piston, said box being provided with a transversely extending passage directly connecting said cylinder and longitudinally extending passage, and also being provided with a curved downwardly facing bearing surface formed with a port affording communication with one of said passages, said spring normally acting to move said piston in a direction for forcing lubricant through said port.

3. A journal box with a bearing surface and having a reservoir, communicating with said surface, comprising a passage extending longitudinally thereof and open at its outer end for the introduction of lubricant, an interior passage extending transversely of said box, a port connecting said interior passage and said longitudinal passage, another passage substantially parallel to said longitudinal passage and communicating with said transverse passage, a cylinder disposed in said last-named passage, a piston operating in said cylinder, and a spring for normally forcing said piston rearwardly towards said transverse passage to maintain the lubricant under pressure and cause it to feed to the bearing surface.

4. A journal box having a lubricant reservoir comprising an interior passage extending longitudinally thereof and open at one end, a cylinder extending longitudinally of said body and spaced at its ends from said longitudinal passage, a piston operating in said cylinder, and a spring cooperating with said piston, said box being provided with a transversely extending passage directly connecting said cylinder and longitudinally extending passage, and also being provided with a curved downwardly facing bearing surface formed with a lubricant distributing groove and a port connecting therewith and affording communication with said reservoir, said spring normally acting to maintain said lubricant under pressure.

5. A journal box formed with a curved downwardly facing bearing surface and having an interior passage for receiving lubricant, said bearing surface being provided with a port affording communication with said passage, a cylinder communicating with said passage, a piston operating in said cylinder, a spring normally acting to move said piston in a direction for forcing lubricant through said port, a follower upon which said spring bears, a rod movable by said follower and extending through an opening in one end of said cylinder, and a spring for normally forcing said follower toward the opposite end of said cylinder.

6. A journal box formed with a curved downwardly facing bearing surface and having a reservoir for lubricant, said bearing surface being provided with a port affording communication with said reservoir, a cored passage, a cylinder mounted therein and communicating with said reservoir, a piston operating in said cylinder, a spring normally acting to move said piston in a direction for maintaining said lubricant under pressure for feeding it through said port, a follower upon which said spring bears, a rod movable by said follower and extending through an opening in said box, and a spring for retracting said rod when the lubricant is depleted to a predetermined extent.

EMIL H. BLATTNER.
EUGENE R. OESCHGER.